United States Patent
Johansen

(10) Patent No.: US 9,207,337 B2
(45) Date of Patent: Dec. 8, 2015

(54) SYSTEMS AND METHODS FOR SEISMIC DATA ACQUISITION EMPLOYING CLOCK SOURCE SELECTION IN SEISMIC NODES

(75) Inventor: Thomas Uteng Johansen, Asker (NO)

(73) Assignee: WesternGeco L.L.C., Houston, TX (US)

(*) Notice: Subject to any disclaimer, the term of this patent is extended or adjusted under 35 U.S.C. 154(b) by 2461 days.

(21) Appl. No.: 11/954,960

(22) Filed: Dec. 12, 2007

(65) Prior Publication Data

US 2009/0154289 A1 Jun. 18, 2009

(51) Int. Cl.
| | |
|---|---|
| *G01V 1/28* | (2006.01) |
| *G01V 1/00* | (2006.01) |
| *H04L 7/00* | (2006.01) |

(52) U.S. Cl.
CPC .............. *G01V 1/00* (2013.01); *H04L 7/0083* (2013.01)

(58) Field of Classification Search
CPC ................................ G01V 1/00; H04L 7/0083
USPC ............. 181/108, 113, 122; 326/96; 327/2, 7, 327/37, 50, 60, 141, 144, 147, 162, 163, 327/291, 292, 298; 332/112; 367/55, 14, 367/21, 38; 375/226, 239, 247, 356, 373, 375/376; 700/3; 702/14, 89
See application file for complete search history.

(56) References Cited

U.S. PATENT DOCUMENTS

| | | | |
|---|---|---|---|
| 5,513,209 A * | 4/1996 | Holm | 375/354 |
| 6,876,710 B1 * | 4/2005 | Pitzer et al. | 375/371 |
| 6,876,874 B2 * | 4/2005 | Arnaud et al. | 455/574 |
| 6,944,188 B2 * | 9/2005 | Sinha et al. | 370/503 |
| 2002/0063588 A1 | 5/2002 | Page et al. | |
| 2005/0047275 A1 | 3/2005 | Chamberlain et al. | |
| 2005/0052951 A1 * | 3/2005 | Ray et al. | 367/188 |
| 2005/0089027 A1 * | 4/2005 | Colton | 370/380 |
| 2007/0070808 A1 | 3/2007 | Ray et al. | |

* cited by examiner

*Primary Examiner* — Daniel L Murphy
(74) *Attorney, Agent, or Firm* — Kevin B. McGoff

(57) ABSTRACT

Systems and methods for acquiring seismic data are described, one system comprising one or more seismic sources, a plurality of sensor modules each comprising a seismic sensor configured to sample analog seismic data, each module comprising a comparing unit comprising software; wherein the software in each module tests clock quality by running a sigma-delta modulator from two different clock sources in the node and compares a noise-floor of the modulator when using the different clocks.

20 Claims, 2 Drawing Sheets

SYSTEMS AND METHODS FOR SEISMIC DATA ACQUISITION EMPLOYING CLOCK SOURCE SELECTION IN SEISMIC NODES

BACKGROUND OF THE INVENTION

1. Field of Invention

The present invention relates to the field of seismic data acquisition systems and methods of using same. More specifically, the invention relates to systems and methods for marine, land, and seabed seismic data acquisition in which the clock source is selected to combine advantages of distributed clock signals and clocks that are phase-locked to another clock.

2. Related Art

Seismic acquisition aims to capture the acoustic and elastic energy that has propagated through the subsurface. The structure in the subsurface may be characterized by physical parameters such as density, compressibility, and porosity. A change in the value of these parameters is referred to as an acoustic or elastic contrast and may be indicative of a change in subsurface layers, which may contain hydrocarbons. When an acoustic or elastic wave encounters an acoustic or elastic contrast, some part of the waves will be reflected back to the surface and another part of the wave will be transmitted into deeper parts of the subsurface. The elastic waves that reach the land surface or seabed surface may be measured by motion sensors (measuring displacement, velocity, or acceleration, such as geophones, accelerometers, and the like) located on the land or seabed. Acoustic waves in marine towed streamer seismic applications may be sensed by hydrophones in the streamers, or by so-called multicomponent streamers having both hydrophones and geophones or accelerometers. The measurement of elastic waves at the land or seabed surface, and acoustic waves in towed streamer seismic applications may be used to create a detailed image of the subsurface including a quantitative evaluation of the physical properties such as density, compressibility, porosity, etc. This is achieved by appropriate processing of the seismic data.

Seismic sampling in a typical seismic sensor network (whether wired or wireless) may comprise up to tens of thousands or more seismic sensors measuring the seismic vibrations or acoustic waves for oil and gas exploration. While data redundancy is increased by increasing the number of sensors, electronic noise also increases, potentially distorting the quality of the sensed data, and negatively affecting gains achieved through sensor redundancy. As illustrated schematically in FIG. 3, phase noise is added when master clock 30 signals through the sensor network in series to seismic sensor nodes 32, 34, 36, etc., each seismic sensor node having a slave clock. In order to increase performance and reduce noise, slave clocks may be phase-synchronized by an electronic phase-locked loop, however this adds to cost and complexity of the systems, increases power requirements, and increases risk of system failure. An alternative is to employ expensive low-noise slave clocks. Thus, while systems and methods as illustrated schematically in FIG. 3 have enjoyed some success, there remains room for improvement. It is of utmost importancy in seismic acquisition to phase-synchronize the sampling of all the seismic sensing nodes with a minimum of noise. However, presently known systems and methods are either more expensive and less flexible, and/or generate significant noise due to the above-mentioned drawbacks. Seismic methods and systems combining advantages of both distributed clocks and phase locked clocks would be desirable to optimize power consumption and clock quality. The present invention is devoted to addressing one or more of these needs.

Published U.S. Pat. App. No. 20070070808 describes a method for recording seismic data under water comprising providing a self-contained, seismic data collection system having at least one geophone, a slave clock and a seismic data recorder; providing a master clock; synchronizing the slave clock with the master clock prior to deploying the seismic data collection system in the water. This reference, however, does not describe seismic methods and systems combining advantages of both clock distribution and phase-locked loops to optimize power consumption and clock quality.

Published U.S. Pat. App. No. 20050047275 describes a network distributed seismic data acquisition system comprising seismic receivers connected to remote acquisition modules, receiver lines, line tap units, base lines, central recording system and a seismic source event generation unit. A GPS may be used to synchronize high precision clocks as well as to provide positioning information. A master clock is designated and one or more high precision clocks is added to the network to correct for timing uncertainty associated with propagation of commands through the network. This reference, however, does not describe seismic methods and systems combining advantages of both clock distribution and phase-locked loops to optimize power consumption and clock quality.

Published U.S. Pat. App. No. 20020063588 describes techniques for providing clocking signals for use in checking seismic equipment. Clocks on and off an integrated circuit chip are aligned so that clocks on the chip are synchronized to one of the rising and falling edges of a master clock and those off the chip are synchronized to the other of the rising and falling edges of the master clock. This apparently permits a certain ease of interfacing circuits controlled by those clocks. Programmable clocks on the chip can be reprogrammed during operation to conserve power. This reference, however, does not describe seismic methods and systems combining advantages of both clock distribution and PLL to optimize power consumption and clock quality.

SUMMARY OF THE INVENTION

In accordance with the present invention, systems and methods for seismic data acquisition are described which reduce or overcome short-comings of previously known systems and methods using phase-locked clocks and/or low noise slave seismic receiver node clocks. Systems and methods of seismic data acquisition in accordance with the invention reduce dependence on costly and inflexible electronic phase-locked clocks and expensive low-noise clocks. In certain embodiments of the inventive systems and methods, software within each sensor node tests node clock quality by running a sigma-delta modulator (which may be a continuous-time sigma-delta modulator) with two different clock sources in the node and compares the noise-floor of the modulator when using the different clocks. The one clock that gives the best noise floor or the one that gives a noise floor below specification may be chosen. The noise floor may be measured by any suitable technique. For example, the noise floor may be measured by calculating the FFT (fast Fourier transform) of the sampled data. Another technique is to use autoregressive modeling on the sampled data. The invention is not limited to using these two techniques. The noise floor may either be performed in the node or in a central recording station which receives sampled data from every node in the seismic system. If done in the central recording station, the seismic system saves power by decreasing processing time. A continuous-time sigma-delta modulator is sensitive to clock phase noise, also called "jitter", and is therefore useful to measure clock quality. A certain proportion of the total number of node clocks may have phase-locking capability to improve clock quality. If noise due to previous node clocks in the network coming into the node is above a defined threshold, the next node will select a clock which is phase-locked to reduce noise to an acceptable level. The phase-locked clock or clocks will only be selected if clock quality does not meet requirements. The purpose of clock selection is to optimize network power consumption and clock quality. Systems and methods of the invention allow more efficient seismic data acquisition, for example 2-D, 3-D and 4-D land seismic data acquisition, such as during exploration for underground hydrocarbon-bearing reservoirs, or monitoring existing reservoirs. Electromagnetic signals may be used to transfer data to and/or from the sensor units, to transmit power, and/or to receive instructions to operate the sensor units.

A first aspect of the invention is a seismic data acquisition system, comprising:
  one or more seismic sources (which may be suitable for land, seabed, or marine use, such as vibrators, explosive charges, air-guns, and the like);
  a sensor system (which may be suitable for land, seabed, or marine seismic) for acquiring and/or monitoring analog seismic sensor data, the sensor system comprising a plurality of sensor modules, each module comprising a comparing unit comprising software; and
  wherein the software in each module tests clock quality by running a sigma-delta modulator (which may be a continuous-time sigma-delta modulator) from two different clock sources and compares a noise-floor when using the different clocks. The two different clocks may be slave and master clocks.

In certain system embodiments of the invention, each node selects its distributed slave clock as the default sensor clock. A phase-locked clock or phase lock loop will only be selected if the distributed slave clock quality does not meet the threshold noise requirements. In certain embodiments a portion, but not all, of the sensor slave clocks are phase-locked to the master clock to improve slave clock quality.

In certain embodiments, each sensor module will comprise an analog to digital converter (ADC) and a digital signal processor (DSP). Certain systems of the invention may comprise each DSP in the sensor system upsampling data at a particular fixed sampling rate relative to the master clock. In certain embodiments the master clock may be a high precision clock. The data may be upsampled using a linear or nonlinear interpolation technique, based on the amount of drift of each sensor module slave clock relative to the master clock, to increase its effective sampling rate.

Certain systems may comprise a data transmission subsystem allowing transmission of data to one or more base stations, which in turn transmits at least some of the data they receive to a recording station, which may be advantageous in wireless systems and methods of the invention. Wireless versions of systems of the invention may comprise a wireless data network, wherein the wireless data network comprises the seismic sensors transmitting at least a portion of the data to one or more base stations via first wireless links which in turn transmit at least some data they receive to the recording station via second wireless links (for a completely wireless system), or through cables, wires, or optical fibers in other embodiments (partially wireless). The recording station need not be on land, and need not be immobile. For example, the recording station may be selected from a stationary land vehicle, a moving land vehicle, a stationary marine vessel, a moving marine vessel, and a moving airborne vessel, such as a helicopter, dirigible, or airplane.

Base stations, if used in wireless or partially wireless systems, may be located strategically to cover predefined groups of sensor modules. In these embodiments, each group of sensor modules may relay data wirelessly via a mesh topology and/or in a hop to hop fashion (also referred to herein as multi-hopping). Star topologies and other topologies may also be used, but mesh topology will produce the greatest redundancy. Between each base station and the data recording station (for example recording truck), seismic data may be transferred directly from base station to recording station.

Systems within the invention include those comprising a first communication link that transmits seismic data sampled from a seismic sensor to a base station (which may be a mobile or non-mobile communication device), the base station having a second communication link that receives the seismic data from the sensor modules and transmits the seismic data to the seismic data recording station, the one or more vibrators having a third communication link that receives commands from the seismic data recording station and transmits seismic source data (such as status information) to the seismic data recording station. As used herein the term "mobile", when used to describe a device, includes hand-held devices and devices that may be worn on the body of a person, for example on a belt, in a pocket, in a purse, and the like. It is not meant to include objects that may in fact be moved, but only with great effort, such as a building or shed, or with less effort a desk top computer. Communication links may be wired or wireless.

Certain seismic data acquisition systems of the invention may utilize wireless links and equipment allowing broadcasting of messages (audio, video, alphanumeric, digital, analog, and combinations thereof) between sensor modules, vibrators, base stations, and the recording station, or simply between the sensor modules. The messages may be time tagged and used for distance measure and clock calibration. The communication network may also be used for transmission of status information and/or quality control (QC).

A second aspect of the invention comprises methods of acquiring seismic data during a seismic survey, including time-lapse (4-D) seismic data acquisition, one method comprising:
  a) initiating one or more seismic sources;
  b) acquiring reflected analog seismic data using a sensor system, the sensor system comprising a plurality of sensor modules each comprising a comparing unit comprising software;
  c) testing clock quality using the software in each module by running a sigma-delta modulator from two different clock sources in each module;
  d) comparing a noise-floor of the modulator when using the different clocks; and
  e) selecting the clock that provides the best noise floor, or the clock that provides the noise floor below a specified value.

As with systems of the invention, the two clocks may be slave and master clocks. Certain methods within the invention may comprise phase-locking the slave clock signals if the noise is over the threshold value, but otherwise not phase-locking the slave clocks in order to conserve power. The reflected analog seismic data may be acquired synchronously or asynchronously. Other methods of the invention include passive listening surveys (where no seismic source is used) and electromagnetic (EM) surveys, where one or more of the sensor units comprises one or more EM sensors.

As used herein, "survey" refers to a single continuous period of seismic data acquisition (which may occur simultaneously, sequentially, or with some degree of time overlap), over a defined survey area; multiple surveys means a survey repeated over the same or a same portion of a survey area but separated in time (time-lapse, sometimes referred to herein as 4-D seismic). In the context of the present invention a single seismic survey may also refer to a defined period of seismic data acquisition in which no controlled seismic sources are active (which also may be referred to alternatively as passive seismic listening or micro seismic measurements).

Systems and methods of using systems of the invention allow more efficient data acquisition (including time-lapse) with less complexity and power consumption than previously known systems and methods. These and other features will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

Figure 1:
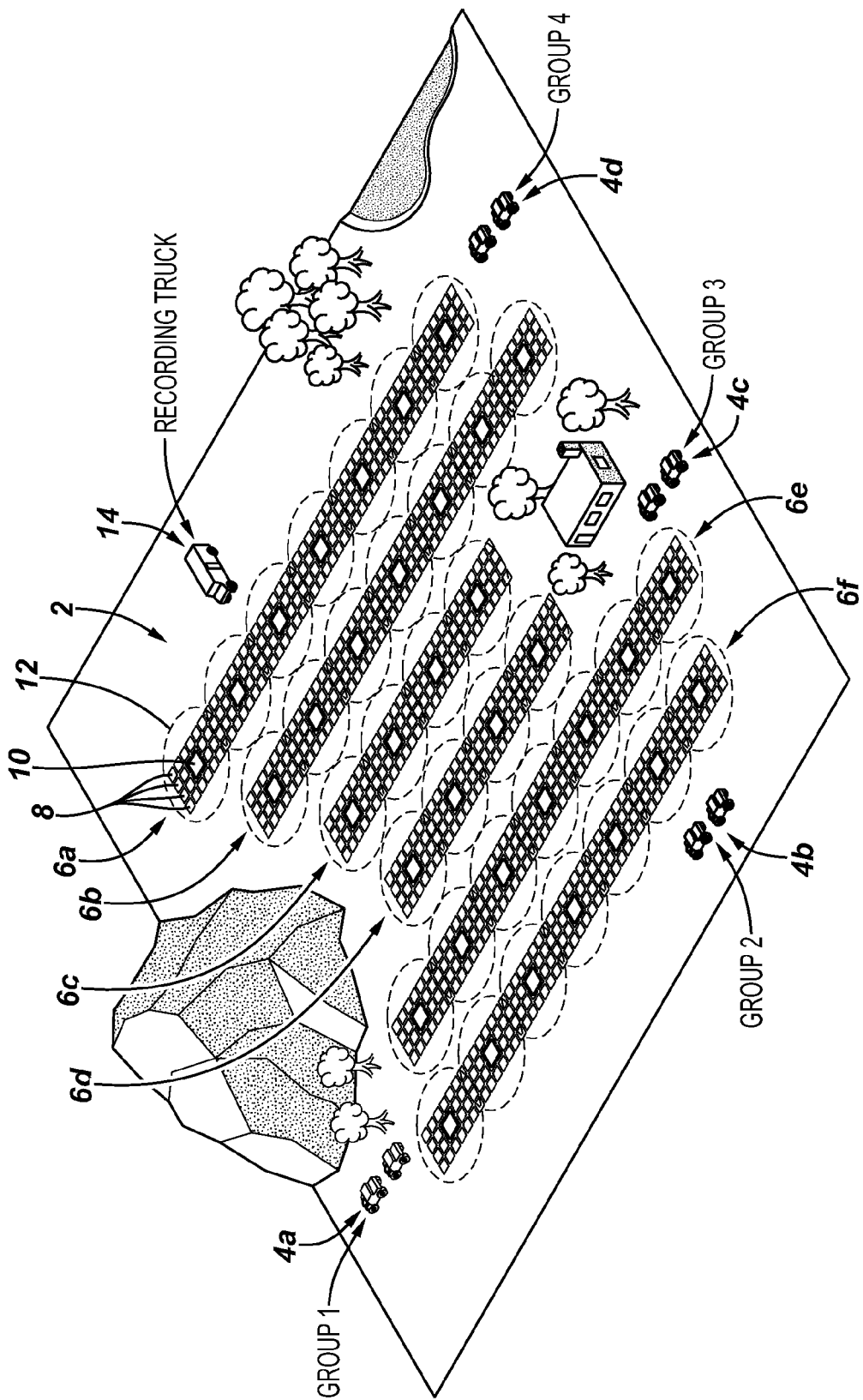
FIG. 1 illustrates a simplified plan view of a land seismic system that may benefit from methods and systems of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

As discussed in U.S. Pat. No. 6,049,882, "synchronous" systems apply a fixed time step signal (i.e., a clock signal) to the functional units to ensure synchronized execution. Thus, in synchronous systems, all the functional units require a clock signal. However, not all functional units need be in operation for a given instruction type. Since the functional units can be activated even when unnecessary for a given instruction execution, synchronous systems can be inefficient. The use of a fixed time clock signal (i.e., a clock cycle) in synchronous systems also restricts the design of the functional units. Each functional unit must be designed to perform its worst case operation within the clock cycle even though the worst case operation may be rare. Worst case operational design reduces performance of synchronous systems, especially where the typical case operation executes much faster than that of the worst case criteria. Accordingly, synchronous systems attempt to reduce the clock cycle to minimize the performance penalties caused by worst case operation criteria. Reducing the clock cycle below worst case criteria requires increasingly complex control systems or increasingly complex functional units. These more complex synchronous systems reduce efficiency in terms of area and power consumption to meet a given performance criteria such as reduced clock cycles.

As is known and explained in U.S. Pat. No. 6,621,435, sigma-delta modulation is a technique which enables a high-resolution analog-digital conversion to be achieved. According to this technique, an analogue signal is "over-sampled," that is, it is sampled at a rate much faster than is necessary for a conventional analog-digital converter operating at the Nyquist rate. A sigma-delta modulator integrates the analog signal and performs a conventional delta modulation on the integral of the signal. For this purpose, the modulator uses a low-resolution quantizer. The output signal of the quantizer is added, with its sign reversed, to the analog input signal, by a feedback loop containing a digital-analog converter. To produce a digital signal corresponding to the analog input signal, the signal output by the modulator is subjected to the action of a so-called digital decimation filter which produces a digital output signal with a sampling rate equal to twice the Nyquist rate. By virtue of the over-sampling and of the digital decimation, this technique achieves a better resolution and less distortion than can be achieved with the technique of conversion at the Nyquist rate. Moreover, since the error signal, that is, the difference between the input signal and the sampled signal, is integrated, the sigma-delta modulator acts as a low-pass filter for the signal and as a high-pass filter for the quantization noise. It thus attenuates the noise in the signal band particularly effectively. The noise attenuation is appreciable even with a first-order sigma-delta modulator, that is, a sigma-delta modulator comprising a single integrator upstream of the quantizer; however, to achieve the high signal-noise ratios required of high-resolution analog-digital converters, it may be necessary to use higher-order modulators, that is, modulators comprising several integrators in cascade.

A simplified schematic view of a land seismic data acquisition system which may benefit from methods and systems of the invention is illustrated in FIG. 1. An area 2 to be surveyed, may have physical impediments to direct wireless communication between, for example, a recording station 14 (which may be a recording truck) and a vibrator 4a. A plurality of vibrators 4a, 4b, 4c, 4d may be employed, as well as a plurality of sensor unit grids 6a, 6b, 6c, 6d, 6e, and 6f, each of which may have a plurality of sensor units 8. As illustrated in FIG. 1, for example approximately 24-28 sensor units 8 may be placed in the general vicinity around a base station 10. The number of sensor units 8 associated with each base station 10 may vary widely according to the goals of the survey number, however, due to the architecture of the communications between the various components, the number should be less than required in previously known systems. Circles 12 indicate the approximate range of reception for each base station 10. This range may be the same or different for each base station.

The system illustrated in FIG. 1, using the plurality of sensor units 8, may be employed in acquiring and/or monitoring land-seismic sensor data for area 2, and transmitting the data to the one or more base stations 10. All communications between vibrators 4, base stations 10, recording station 14, and seismic sensors 8 may be fully wired, partially wired and partially wireless, or completely wireless. A completely wireless system is illustrated schematically in FIG. 2, wherein the wireless data network comprises multiple seismic sensors 8 transmitting at least a portion of the seismic data they sense to the one or more base stations 10 via first wireless links 9, which in turn transmit at least some data they receive to the recording station 14 via second wireless links 16. Commands may be sent from recording station 14 to vibrators 4 via wireless links 18, and, to the extent data is exchanged between vibrators 4 and recording station 14, wireless links 18 may also be considered part of the wireless data network.

Figure 3:
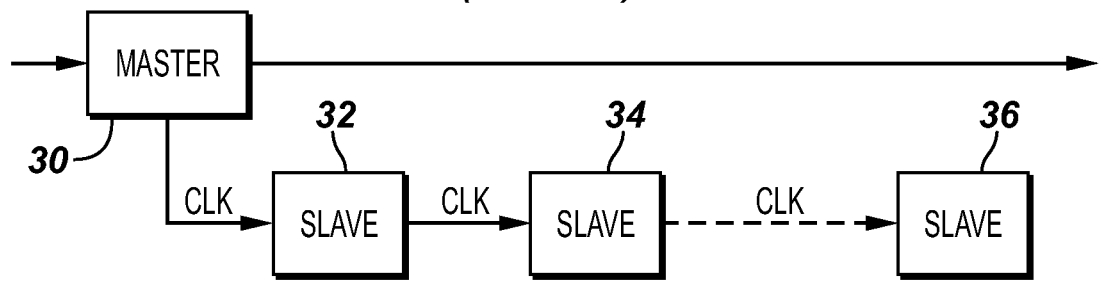
FIG. 3 illustrates schematically clock distribution in a typical prior art seismic sensor network.

FIG. 3 illustrates schematically clock distribution in a typical prior art seismic sensor network, illustrating phase noise is added when master clock 30 signals through the sensor network in series to seismic sensor nodes 32, 34, 36, etc., each seismic sensor node having a slave clock. In order to increase performance and reduce noise, slave clocks may be phase-synchronized by an electronic phase-locked loop, however this adds to cost and complexity of the systems, increases power requirements, and increases risk of system failure. An alternative is to employ expensive low-noise slave clocks. Thus, while systems and methods as illustrated schematically in FIG. 3 have enjoyed some success, there remains room for improvement. It is of utmost important in seismic acquisition to phase-synchronize the sampling of all the seismic sensing nodes with a minimum of noise. However, presently known systems and methods are either more expensive, less flexible, and/or generate significant noise due to the above-mentioned drawbacks. Seismic methods and systems combining advantages of both distributed clocks and phase locked clocks would be desirable to optimize power consumption and clock quality.

Figure 4:
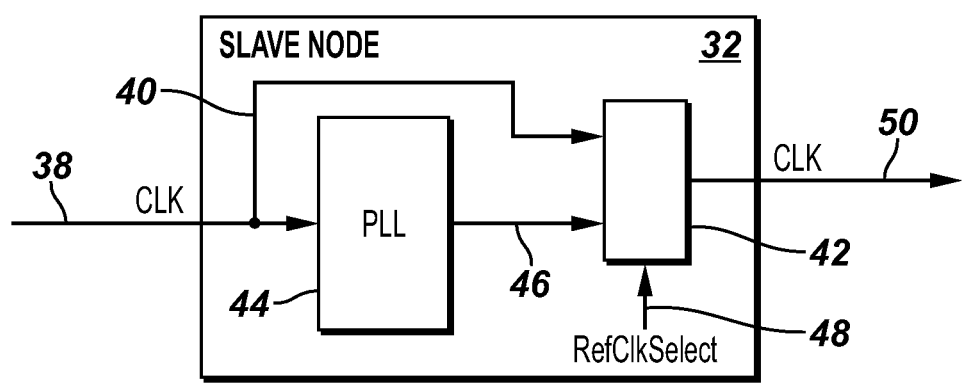
FIG. 4 illustrates schematically a sensor node and slave clock comprising an internal phase-locked loop with a bypass option in accordance with methods and systems of the invention.

FIG. 4 illustrates schematically a seismic sensor node 32 modified in accordance with the present invention to include sigma delta modulation software, and which may be used in seismic systems and methods of the invention. Sensor node 32 is illustrated receiving a clocking signal 38 from a previous sensor node. Clocking signal 38 is simultaneously phase-locked in phase-lock loop 44 to form a phase-locked signal 46, and signal 38 is also sent (as indicated by bypass line 40) to a digital signal multiplexing and comparing unit 42. Unit 42 includes software for comparing the noise floor of the clocking signals 40 and 46 modulated by the sigma-delta modulator. The software determines one clock that provides the best noise floor, or the one clock that provides a noise floor below a predetermined specification. The noise floor may be measured and/or calculated by any technique, one such technique being calculating the FFT (fast Fourier transform) of the sampled data. Another technique is to use autoregressive modeling on the sampled data. The noise floor calculation may either be performed in the node or in a central recording station which receives sampled data from every node in the seismic system. If done in the central recording station, the seismic system saves power by decreasing processing time. A continuous-time sigma-delta modulator is sensitive to clock phase noise, also called "jitter", and is therefore useful to measure clock quality. If acceptable in terms of noise being below threshold, this selected signal is sent to the next node as signal 50. Node 32 thus combines advantages of both distributed clocks and phase-locked clocks. In methods and systems of the invention combining both clock distribution and PLL, power consumption and clock quality are optimized. Each node will select distributed clock as default, but as phase noise is added when the clock is distributed through the sensor network from node to node, the PLL will ideally be running in a few nodes to improve clock quality. The PLL clock will only be selected if clock quality does not meet noise requirements.

The digital signal multiplexing and comparing unit 42 may be a computer programmed using assembly language software, higher order software code, such as C language, or an object-oriented language such as C++ language, and then using a suitable compiler.

Systems of the invention may comprise each DSP in the sensor system upsampling seismic data to a particular fixed sampling rate relative to the master clock, which may be a high precision clock. The seismic data may then be downsampled to a fixed sampling frequency relative to the master precision clock.

Systems and methods of the invention may use decimation, the process of filtering and downsampling a signal to decrease its effective sampling rate. The filtering may be employed to prevent aliasing that might otherwise result from downsampling. The operation of downsampling by factor M∈N (where "N" represents the set of natural numbers) describes the process of keeping every Mth sample and discarding the rest. This is denoted by "↑ M" in block diagrams. Interpolation is the process of upsampling and filtering a signal to increase its effective sampling rate. The operation of upsampling by factor L∈N describes the insertion of L−1 zeros between every sample of the input signal. This is denoted by "↑ L" in block diagrams.

Systems and methods of the invention may operate using interpolation techniques. Suitable interpolation techniques include any method of constructing new data points from a discrete set of known data points. There are many different interpolation methods, such as linear, polynomial, spline, and the like. Some of the concerns to take into account when choosing an appropriate interpolation algorithm are how accurate is the method, how expensive is it, how smooth is the interpolant, and how many data points are needed. Linear interpolation is generally easier to implement that other interpolation methods, but may not have the desired accuracy. Error is proportional to the square of the distance between the data points. Another disadvantage is that the interpolant is not differentiable at the point of interest. Polynomial interpolation is a generalization of linear interpolation. In linear interpolation, the interpolant is a linear function. In polynomial interpolation the linear interpolant is replaced by a polynomial of higher degree. The interpolation error is proportional to the distance between the data points to the power n, where n is the number of known data points. Furthermore, the interpolant is a polynomial and thus infinitely differentiable. However, polynomial interpolation also has some disadvantages. Calculating the interpolating polynomial may be relatively computationally expensive. Furthermore, polynomial interpolation may not be exact at the end points. These disadvantages can be avoided by using spline interpolation. Spline interpolation uses low-degree polynomials in each of the intervals, and chooses the polynomial pieces such that they fit smoothly together. The resulting function is called a spline. Other forms of interpolation may be used in the systems and methods of the invention by picking a different class of interpolants. Some examples include, rational interpolation, which is interpolation by rational functions, and trigonometric interpolation, which is interpolation by trigonometric polynomials. The discrete Fourier transform is a special case of trigonometric interpolation. Another possibility is to use wavelets. Multivariate interpolation is the interpolation of functions of more than one variable, and such methods include bilateral interpolation and bicubic interpolation in two dimensions, and trilateral interpolation in three dimensions.

Systems and methods of the invention may be used in land-, seabed- and marine-seismic surveying, and may employ wired (copper wires or optical fiber connections) or wireless transmission of data and commands.

Digital signal processors useful in the invention may be either fixed or floating-point DSPs, and are available from a number of suppliers, including Texas Instruments, Analog Devices, Lucent Technologies, Infineon, and Philips. Programming of fixed or floating-point DSPs may be accomplished using a number of techniques, ranging from programming directly using assembly language, which may be difficult, to programming a higher order code, such as C language, or an object-oriented language such as C++ language, and then using a suitable compiler.

Systems and methods of the invention may be "completely wireless", wherein all wires, cables, and fibers for communication between vibrators, seismic sensors, base stations, and the recording station are substantially eliminated. This does not rule out the use of wires, cables, or fibers (such as optical fibers) for example in the recording station equipment and vibrators, for example for power, and the use of tie-down cables if necessary in windy conditions. In marine systems, this does not rule out towing cables, distance cables, and the like, required to deploy the seismic sources and sensors, deflectors, and the like.

Sensor units useable in the invention may include, in addition to measurement sensors, a slave clock, and in certain nodes a PLL, low-power electronics, long-term battery and memory components, and an autonomous power generating unit which provides power to charge the batteries in the sensor units without being reliant on power charge from external means.

In certain embodiments, the sensor units may remain on the land between seismic surveys or be removed therefrom. During idle periods, an autonomous power generation component, if present, will generate enough power to recharge the autonomous power source, which may be one or more rechargeable batteries, one or more capacitors, and the like. Batteries and capacitors may be based on any chemistry as long as they are self-sufficient for the duration intended, which may be months to years. Batteries or battery cells such as those known under the trade designation "Li-ion VL45E", available from SAFT, Bagnolet, France, may be used. Another alternative is to use capacitors as storage devices for power. Capacitors are generally smaller and have higher storage capacity. Furthermore, sensor units of the invention may be placed in "sleep" mode for energy conservation during periods of no operation.

Sensors useable in the invention for land-based seismic may be individual sensors or a package of two or more sensors. One suitable sensor package is that known under the trade designation "4C Sensor" available from WesternGeco LLC, comprised of three geophones or accelerometers. Sensor units useable in the invention may also comprise an electronics module having ultra-low power requirements, and may include power management software and hardware, and a control module for data input/output.

Figure 2:
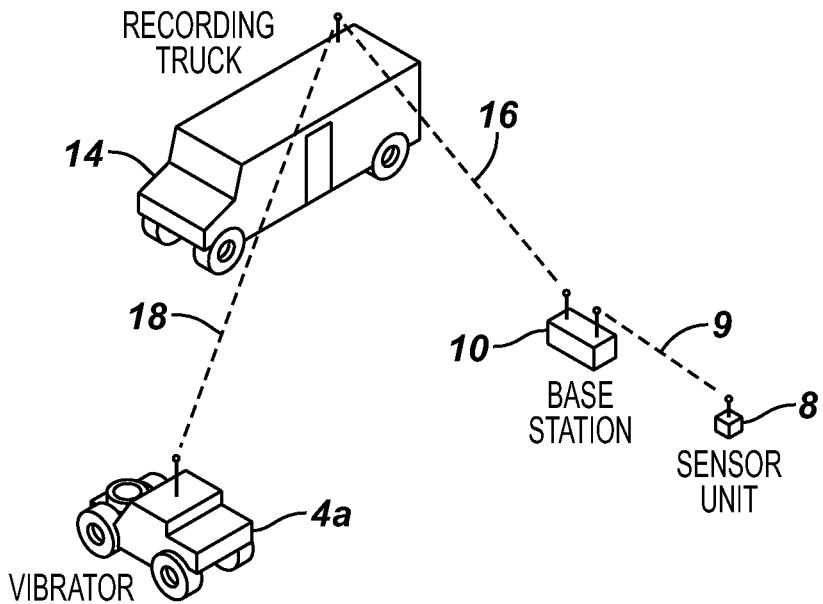
FIG. 2 illustrates schematically communication links that may be employed in methods and systems of the invention.

Seismic data that is recorded by the sensor units may be transferred to base stations, and in turn to a recording station as illustrated in FIG. 2. In other embodiments it may be desirable to remove and transport one or more memory modules from a particular sensor unit. For example, one might equip a sensor unit with N memory modules for N surveys. In these embodiments, for example, for each survey one memory module is taken out. Both methods of data transfer may be used. In certain embodiments data transfer may be achieved through multiple channels and/or by multiple methods in order to increase the speed and/or amount of the data transmission.

Methods of using systems of the invention may include measurement, calculation and other sub-systems useful in implementing methods of the invention. Calculation units may include software and hardware allowing the implementation of one or more equations, algorithms and operations as required, as well as access databases, data warehouses and the like, via wire or wireless transmission.

The initial position to within few meters of accuracy of one or more sensor units of the invention may be determined for instance by using GPS, if desired.

The performance of a marine seismic acquisition survey typically involves one or more vessels towing at least one seismic streamer through a body of water believed or known to overlie one or more hydrocarbon-bearing formations. WesternGeco L.L.C. currently conducts high-resolution Q-Marine™ surveys, in some instances covering many square kilometers. A survey vessel known as a Q-Technology™ vessel may conduct seismic surveys towing multiple, 1000-12000-meter cables with a separation of 25-200 meters, using the WesternGeco proprietary calibrated Q-Marine™ source. "Q" is the WesternGeco proprietary suite of advanced seismic technologies for enhanced reservoir location, description, and management, including Q-Marine™, Q-Land™ and Q-Seabed™ which are fully calibrated, point-receiver marine, land, and seabed seismic acquisition and processing systems, respectively. In towed streamer marine seismic data acquisition systems, the seismic vessel and streamers progress forward at about 5 knots and the system is able to cover large areas of open ocean relatively efficiently. Thus, the traditional towed streamer seismic acquisition system is well-suited to explore the geological structures of previously unexplored or unexploited areas.

It is within the invention to interface systems of the invention with other data acquisition systems and methods, for example other seismic data acquisition systems, such as cable-based systems, and systems using previously known seismic systems. As one non-limiting example, where a reliable land cable has been operating successfully, one might use that land cable and its sensors, and position sensor units in a on one or both sides of the cable.

In certain embodiments, regardless of the environment or survey area, a higher density of sensor units throughout the spread may improve overall operational efficiency by decreasing the distances between the sensor units and the associated degradation of wireless signals. The shape of the sensor units or grids of sensor units is not in itself relevant.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

In accordance with some embodiments, a seismic data acquisition system includes one or more seismic sources; and a sensor system for acquiring and/or monitoring analog seismic sensor data. The sensor system includes a plurality of sensor modules, with each module including a comparing unit that includes software. The software in each module tests clock quality by running a sigma-delta modulator from two different clock sources and compares a noise-floor of the modulator when using the different clocks.

In accordance with some embodiments, a seismic data acquisition system includes one or more seismic sources; and a sensor system for acquiring and/or monitoring analog seismic sensor data. The sensor system includes a plurality of sensor modules, with each module including a comparing unit that includes software. The software in each module tests clock quality by running a sigma-delta modulator from two different clock sources and compares a noise-floor of the modulator when using the different clocks. The two different clock sources include a distributed slave clock and a master clock.

In accordance with some embodiments, a method includes a) initiating one or more seismic sources; b) acquiring reflected analog seismic data using a sensor system, where the sensor system includes a plurality of sensor modules each including a comparing unit comprising software; c) testing clock quality using the software in each module by running a sigma-delta modulator from two different clock sources in each module; d) comparing a noise-floor of the modulator when using the different clocks; and e) selecting the clock that provides the best noise floor, or the clock that provides the noise floor below a specified value.

What is claimed is:

1. A seismic data acquisition system comprising:
   one or more seismic sources;
   a sensor system for acquiring and/or monitoring analog seismic sensor data, the sensor system comprising a plurality of sensor modules, each module comprising a comparing unit comprising software;
   wherein the software in each module tests clock quality by running a sigma-delta modulator from two different clock sources and compares a noise-floor of the modulator when using the different clock sources.

2. The system of claim 1 for performing land seismic data acquisition.

3. The system of claim 1 for performing marine seismic data acquisition.

4. The system of claim 1 wherein the two different clock sources comprise a distributed slave clock, and the module selects its distributed slave clock as the default sensor clock.

5. The system of claim 4 wherein a portion, but not all, of the distributed sensor slave clocks are phase-locked to a master clock by a phase lock loop to improve slave clock quality.

6. The system of claim 5 wherein the master clock is a high precision clock.

7. The system of claim 6 wherein seismic data is upsampled using a linear or nonlinear interpolation technique, based on the amount of drift of each sensor module slave clock relative to the master clock, to increase an effective sampling rate of the seismic data.

8. The system of claim 1 wherein each sensor module comprises a phase lock loop.

9. The system of claim 1 wherein each sensor module comprises a phase lock loop that is engaged only if noise in a distributed sensor slave clock is above a threshold value.

10. The system of claim 9 wherein each sensor module comprises an analog to digital converter (ADC) and a digital signal processor (DSP).

11. The system of claim 1 comprising a base station that is selected from mobile and non-mobile communication devices.

12. The system of claim 1 comprising a data transmission sub-system allowing transmission of data to one or more base stations, which in turn transmit at least some of the data they receive to a recording station.

13. The system of claim 12 comprising a first communication link that transmits seismic data sampled from a seismic sensor to a base station, the base station having a second communication link that receives the seismic data from the sensor modules and transmits the seismic data to the seismic data recording station, the one or more seismic sources having a third communication link that receives commands from the seismic data recording station and transmits seismic source data to the seismic data recording station.

14. A seismic data acquisition system comprising:
   one or more seismic sources;
   a sensor system for acquiring and/or monitoring analog seismic sensor data, the sensor system comprising a plurality of sensor modules, each module comprising a comparing unit comprising software;
   wherein the software in each module tests clock quality by running a sigma-delta modulator from two different clock sources and compares a noise-floor of the modulator when using the different clock sources wherein the two different clock sources comprises a distributed slave clock and a master clock.

15. The system of claim 14 for performing land seismic data acquisition.

16. The system of claim 15 for performing marine seismic data acquisition.

17. The system of claim 16 wherein each sensor module selects its distributed slave clock as the default sensor clock.

18. A method comprising:
   a) initiating one or more seismic sources;
   b) acquiring reflected analog seismic data using a sensor system, the sensor system comprising a plurality of sensor modules each comprising a comparing unit comprising software;
   c) testing clock quality using the software in each module by running a sigma-delta modulator from two different clock sources in each module;
   d) comparing a noise floor of the modulator when using the different clock sources; and
   e) selecting the clock source from the two different clock sources that provides the best noise floor, or a clock that provides the noise floor below a specified value.

19. The method of claim 18 wherein the two different clock sources comprise a slave clock source, the method further comprising phase-locking the slave clock source if the noise floor when using the slave clock source is over a threshold value, but otherwise not phase-locking the slave clock source in order to conserve power.

20. The method of claim 18, wherein the slave clock source comprises a plurality of slave clock sources, the method further comprising phase-locking a portion, but not all, of the sensor slave clock sources to a master clock to improve slave clock source quality.

* * * * *